UNITED STATES PATENT OFFICE.

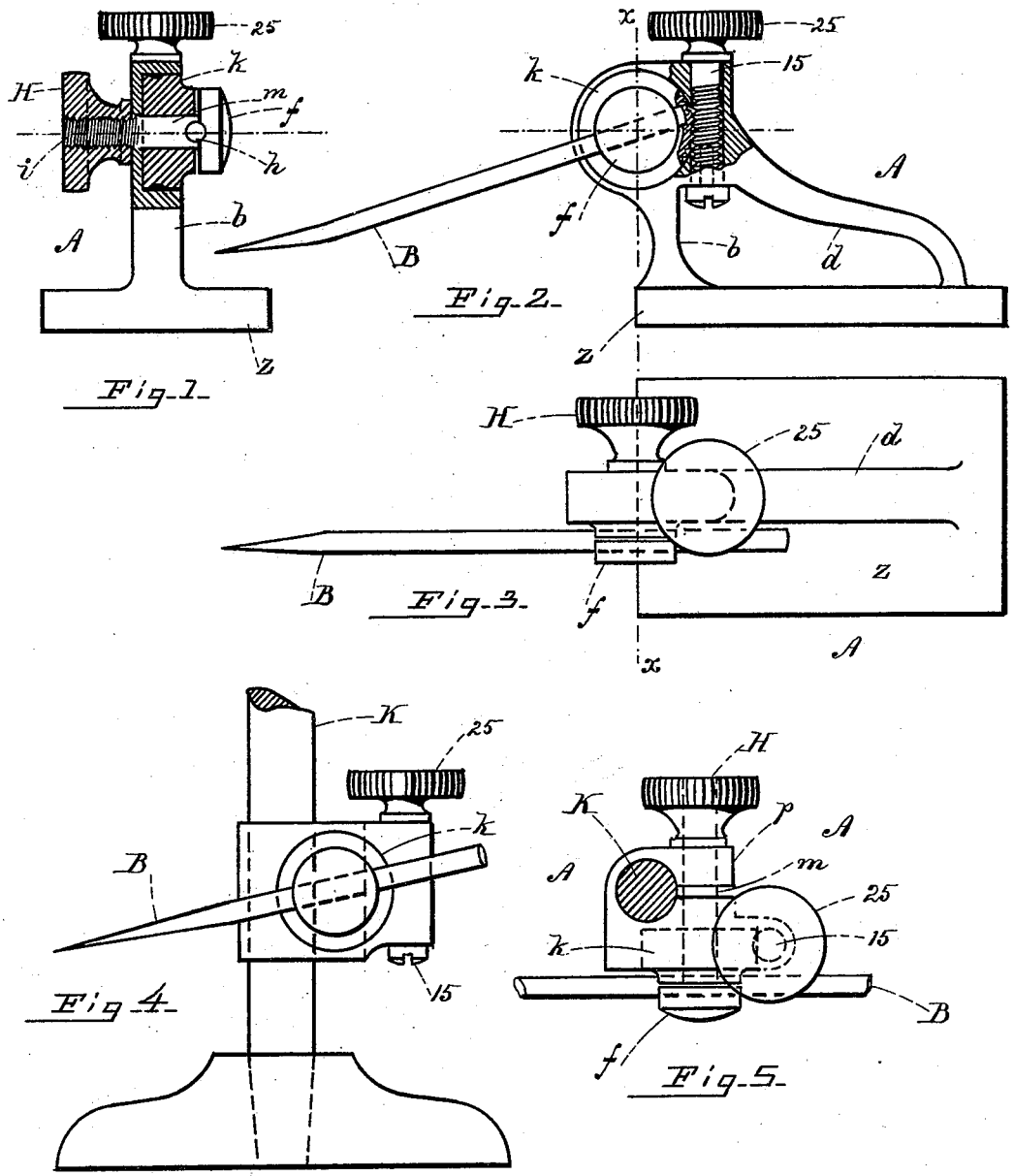

CARL G. OSTEMAN, OF BOSTON, MASSACHUSETTS.

SURFACE-GAGE.

SPECIFICATION forming part of Letters Patent No. 396,109, dated January 15, 1889.

Application filed September 6, 1888. Serial No. 284,699. (No model.)

*To all whom it may concern:*

Be it known that I, CARL G. OSTEMAN, of Boston, in the county of Suffolk, State of Massachusetts, have invented a certain new and useful Improvement in Surface-Gages, of which the following is a description sufficiently full, clear, and exact to enable any person skilled in the art or science to which said invention appertains to make and use the same, reference being had to the accompanying drawings, forming part of this specification, in which—

Figure 1 is a front elevation of my improved gage, certain parts being shown in vertical transverse section taken on line $x\ x$ in Fig. 2; Fig. 2, a side elevation of the gage, a portion of the body being broken away to show the worm; Fig. 3, a top plan view of the gage in position for use; Fig. 4, a side elevation showing the gage in use on a standard, the standard being represented as broken off; and Fig. 5, a top plan view of the same.

Like letters and figures of reference indicate corresponding parts in the different figures of the drawings.

My invention relates to that class of gages which are employed in ascertaining inequalities in plane surfaces; and it consists in certain novel features, as hereinafter fully set forth and claimed, the object being to produce a simpler, cheaper, and more effective device of this character than is now in ordinary use.

The nature and operation of the improvement will be readily understood by all conversant with such matters from the following explanation.

In the drawings, A represents the body of the gage considered as a whole, and B the pointer.

The body A consists of a bed-plate, $z$, the under side of which is an accurate plane surface. Vertical standards $b\ d$ are united at their upper ends and cast integral with the bed-plate $z$. A horizontally-arranged shaft, $m$, is fitted to revolve in the upper end of the standard $b$, said shaft being provided with a head, $f$, (see Fig. 1,) on one end and screw-threaded at $i$ on the opposite end to receive a nut, H. A lateral hole or opening, $h$, (see Fig. 1,) is formed in the shaft $m$ near the head $f$ to receive the pointer B. Loosely disposed on the shaft $m$, and fitted to revolve closely in a socket formed to receive it in the upper ends of the standards $b\ d$, is a vertically-arranged worm-gear, $k$. (See Fig. 1.) The outer face of the gear $k$ is provided with a transverse slot, (not shown,) in which the pointer B rests and prevents said gear from revolving on the shaft $m$. A vertically-arranged worm, 15, provided with a rosette, 25, is fitted to revolve in the top of the standard $d$, its teeth intermeshing with the teeth of the gear $k$, as shown in Fig. 2.

In the use of my improvement the pointer B is disposed in the opening $h$ in the shaft $m$ and the nut H turned onto the screw-threaded end of said shaft, thereby causing the head $f$ to clamp said pointer securely in the slot in the outer face of the gear $k$. By turning the rosette 25 the worm 15 will cause the gear $k$ to rotate, carrying with it the shaft $m$, and moving the pointer B a corresponding distance.

It will be readily understood that by using a worm and gear for adjusting the pointer, as described, it is securely held in position, and is not liable to be accidentally displaced.

In the modification shown in Figs. 4 and 5 the bed-plate $z$ and standards $b\ d$ are dispensed with, and a clamping-arm, $p$, (see Fig. 5,) is formed on the body, which is adapted to inclose a detachable standard, K, and in which the shaft $m$ is also journaled. When the nut H is turned onto the shaft, as described, it engages said arm and forces it against the standard K, thereby securely holding the gage in position.

Having thus explained my invention, what I claim is—

1. In a surface-gage, the combination of a body, a shaft journaled in said body and provided with an opening for receiving a pointer, a worm-gear on the shaft, provided with a pointer-groove, a worm in said body for actuating said gear, a nut on the shaft, whereby the pointer may be clamped onto said groove, and means for securing said body to a base or support, substantially as set forth.

2. In a surface-gage, the combination of a standard, a body provided with a clamping-arm for securing it to said standard, a shaft journaled in said body and arm and provided with a transverse opening for receiving a pointer, a worm-gear disposed on said shaft and fitted to revolve in said body, said gear being provided in its outer face with a transverse slot for receiving said pointer, a worm fitted to revolve in said body and rotate said gear, and a nut adapted to be turned onto said shaft, whereby said body may be clamped onto said standard and said pointer clamped against said worm-gear and prevent it from revolving on the shaft as the worm is turned, substantially as set forth.

3. In a surface-gage, the standard K, in combination with the body A, having the clamping-arm $p$, the shaft $m$, journaled in said arm and body, the pointer B, disposed in an opening in said shaft, the worm-gear $k$, fitted to rotate in said body and provided with a slot in which said pointer may rest, the worm 15, journaled in said body in engagement with said gear, and provided with the rosette 25, and the nut H, adapted to be turned onto said shaft, whereby said body may be clamped in position on said standard and said pointer clamped against said gear, substantially as described.

CARL G. OSTEMAN.

Witnesses:
C. A. SHAW,
B. D. STEVENS.